United States Patent
Cassidy

(10) Patent No.: US 7,172,148 B2
(45) Date of Patent: Feb. 6, 2007

(54) GROOVED PYRAMID DISPERGER PLATE

(75) Inventor: Danny Cassidy, London (GB)

(73) Assignee: Andritz Inc., Glens Falls, NY (US)

( * ) Notice: Subject to any disclaimer, the term of this patent is extended or adjusted under 35 U.S.C. 154(b) by 68 days.

(21) Appl. No.: 11/023,850

(22) Filed: Dec. 28, 2004

(65) Prior Publication Data
US 2005/0194482 A1 Sep. 8, 2005

Related U.S. Application Data

(60) Provisional application No. 60/542,126, filed on Feb. 5, 2004.

(51) Int. Cl.
*B02C 7/04* (2006.01)
*B02C 1/10* (2006.01)

(52) U.S. Cl. .................... 241/261.3; 241/296

(58) Field of Classification Search ................ 241/298, 241/296, 261.3, 261.2
See application file for complete search history.

(56) References Cited

U.S. PATENT DOCUMENTS

| | | | |
|---|---|---|---|
| 3,473,745 A * | 10/1969 | Soars, Jr. et al. ........... | 241/298 |
| 5,690,286 A * | 11/1997 | Dodd et al. .................. | 241/296 |
| 5,863,000 A | 1/1999 | Gingras ........................ | 241/28 |
| 5,893,525 A | 4/1999 | Gingras ....................... | 241/298 |
| 5,971,307 A * | 10/1999 | Davenport ............... | 241/259.1 |
| 6,032,888 A | 3/2000 | Deuchars .................. | 241/261.3 |
| 6,311,907 B1 | 11/2001 | Gingras ........................ | 241/28 |
| 6,402,071 B1 | 6/2002 | Gingras .................... | 241/261.2 |
| 6,592,062 B1 * | 7/2003 | Virving ................... | 241/261.3 |
| 6,607,153 B1 | 8/2003 | Gingras .................... | 241/261.3 |

* cited by examiner

*Primary Examiner*—Faye Francis
(74) *Attorney, Agent, or Firm*—Alix, Yale & Ristas, LLP

(57) ABSTRACT

A disperger plate segment, for removing contaminants from recycled, or recovered, paper and packaging materials includes radially concentric rows of teeth. Each row of teeth includes teeth and channels disposed intermediate the teeth. Each of the teeth have an upper, top surface, a radially inner face extending from the channel base surface to the tooth top surface, and a radially outer face extending from the channel base surface to the tooth top surface. The teeth inner and outer faces each have a groove extending from the tooth top surface to a position intermediate the tooth top surface and the channel base surface.

17 Claims, 3 Drawing Sheets

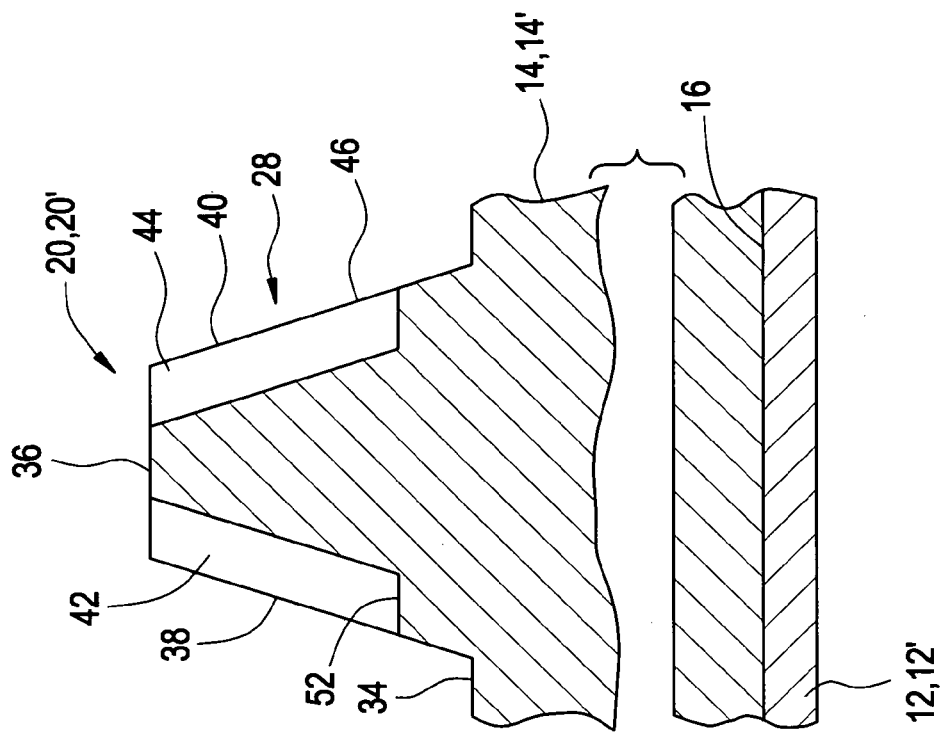
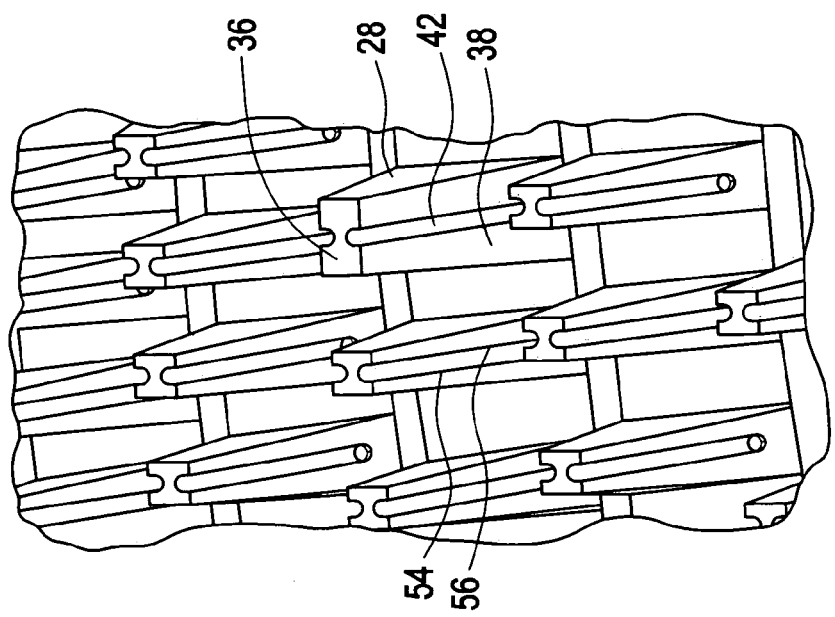

GROOVED PYRAMID DISPERGER PLATE

CROSS-REFERENCE TO RELATED APPLICATIONS

This application claims the benefit under 35 U.S.C. § 119(e) of U.S. Provisional Patent Application Ser. No. 60/542,126 filed Feb. 5, 2004.

BACKGROUND OF THE INVENTION

This invention relates generally to dispergers for removing contaminants from recycled, or recovered, paper and packaging materials. More particularly, the present invention relates to disperger plate segments for use in such apparatus.

Recovered paper and packaging materials are subjected to several processes designed to remove ink, toner in the case of copy paper, and contaminants such as plastics generally referred to as "stickies". The removal processes are not completely efficient and the residual ink, toner and stickies must be dispersed or else the stickies adhere to parts of the paper machine and cause holes or weak spots in new paper. Residual ink particles appear as specs in the reconstituted paper lowering its value considerably.

A machine called a disperger is used to reduce the size of the ink and stickie particles so that in subsequent paper machine operations paper qualities are minimally impacted. The general configuration of this machine is two circular discs facing each other with one disc (rotor) being rotated at up to 1800 rpm. The other disc is stationary (stator). On the faces of the discs are mounted plate segments having pyramids or teeth mounted in tangential rows. The rows are at radii chosen to allow the rotor and stator pyramids to intersect the plane between the discs so that the fiber passing from the center of the stator to the periphery of the discs must receive impacts from the rotor pyramids as they pass close to the stator pyramids. The clearance between rotor and stator pyramids is on the order of 1 to 12 mm so that the fibers are not cut but severely and alternately flexed. This action breaks the ink and toner particles into smaller particles and also breaks the stickie particles and it is thought that the fresh sticky surfaces collect fine fiber particles and are further passivated as smaller particles. Increasing the number of flexures the fibers experience has been shown to improve the particle reduction process. Adding more pyramids generally improves the efficiency of the dispersion process but the size of the pyramids that can be manufactured at reasonable costs limits this number.

SUMMARY OF THE INVENTION

Briefly stated, the invention in a preferred form is a disperger plate segment for removing contaminants from recycled, or recovered, paper and packaging materials. The segment comprises radially concentric rows of teeth, each row of teeth including teeth and channels disposed intermediate the teeth. Each of the teeth have an upper, top surface, a radially inner face extending from the channel base surface to the tooth top surface, and a radially outer face extending from the channel base surface to the tooth top surface. The teeth inner and outer faces each have a groove extending from the tooth top surface to a position intermediate the tooth top surface and the channel base surface.

The inner and outer faces of each tooth extend at an acute angle from the channel base surface to the top surface, such that the tooth has a truncated pyramid shape. A segment of the tooth top surface separates the groove of the inner face and the groove of the outer face.

Each of the teeth also has oppositely disposed leading and trailing edges. The groove of the inner face of each tooth and the groove of the outerface of each tooth define an additional leading edge and an additional trailing edge on the inner and outer faces of each tooth, respectively.

Alternatively, the invention is a disperger for removing contaminants from recycled, or recovered, paper and packaging materials. The disperger has relatively rotating, opposed first and second discs carrying plates formed by multiple segments. Each segment comprises radially concentric rows of teeth, each row of teeth including teeth and channels disposed intermediate the teeth. Each of the teeth have an upper, top surface, a radially inner face extending from the channel base surface to the tooth top surface, and a radially outer face extending from the channel base surface to the tooth top surface. The teeth inner and outer faces each have a groove extending from the tooth top surface to a position intermediate the tooth top surface and the channel base surface.

The rows of teeth of the plate carried by the first disc and the rows of teeth of the plate carried by the second disc intersect a plane disposed intermediate the first and second discs. The teeth of the plate carried by the first disc and the teeth of the plate carried by the second disc define a clearance gap having a value of 1 to 12 mm.

Each of the teeth also has oppositely disposed leading and trailing edges. The leading and trailing edges of each tooth of the plate carried by the first disc create an intersection with the leading and trailing edges of corresponding teeth of the plate carried by the second disc as the discs relatively rotate. The intersections flex fibers of the paper or packaging materials, breaking the contaminants into pieces. The grooves define an additional leading edge and an additional trailing edge on the inner and outer faces of each tooth, creating additional intersections.

BRIEF DESCRIPTION OF THE DRAWINGS

The present invention may be better understood and its numerous objects and advantages will become apparent to those skilled in the art by reference to the accompanying drawings in which:

FIG. 3 is an enlarged perspective view of the teeth of the disperger plate segment of FIG. 1; and FIG. 4 is an enlarged cross-sectional view taken along line 4–4 of FIG. 1.

DETAILED DESCRIPTION OF THE PREFERRED EMBODIMENT

With reference to the drawings wherein like numerals represent like parts throughout the several figures, a portion of a substantially circular disperger plate in accordance with the present invention is generally designated by the numeral 10. Generally, a disperger has two circular discs facing each other with one disc (the rotor) 12 being rotated at up to 1800 rpm. The other disc (the stator) 12' is stationary. Alternatively, both of the discs 12, 12' may be rotors, with one of the discs rotating in a clockwise direction and the other rotor rotating in a counter-clockwise direction.

Figure 1:
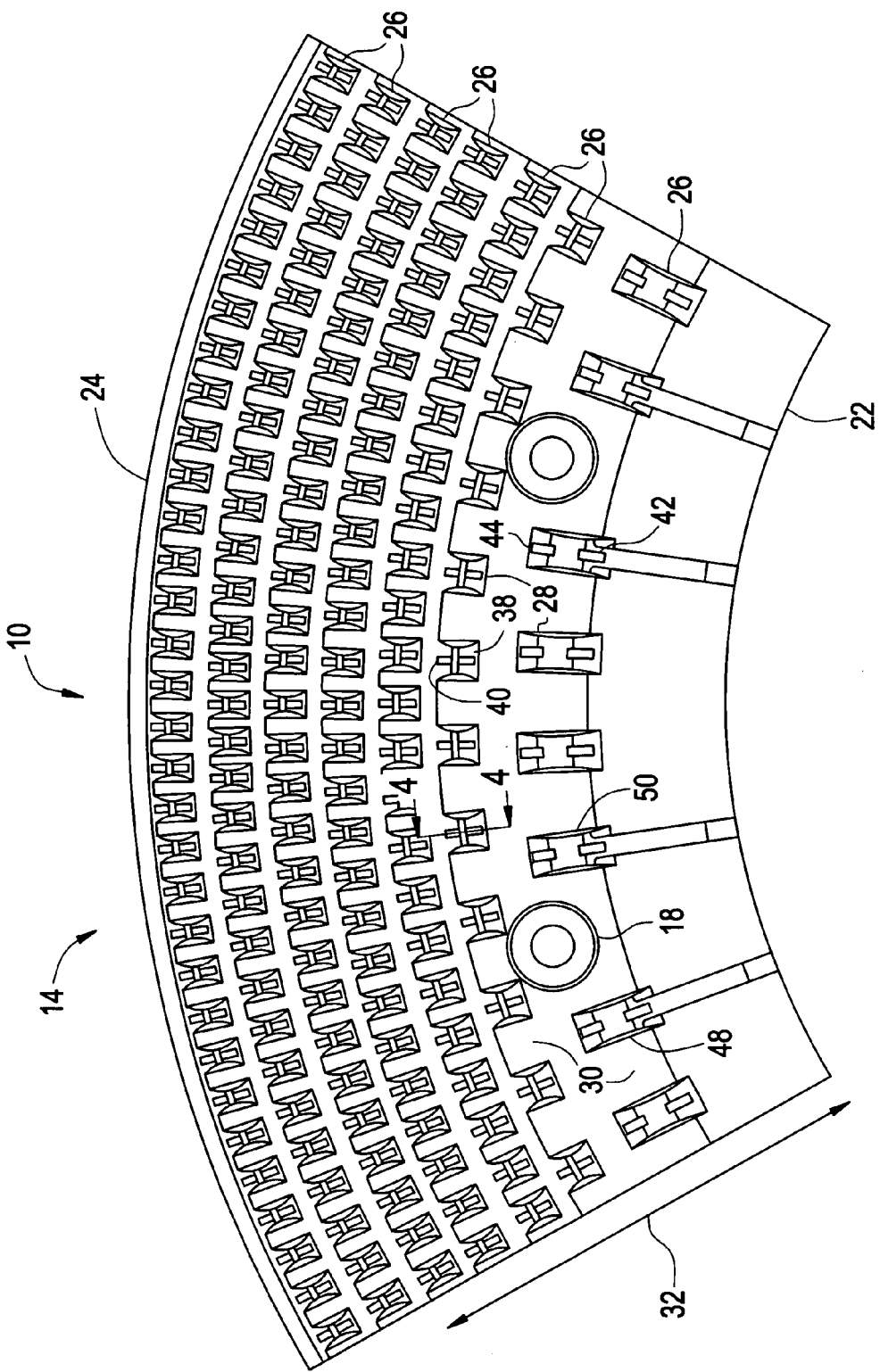
FIG. 1 is an elevation view of a disperger plate segment in accordance with the invention.
Figure 2:
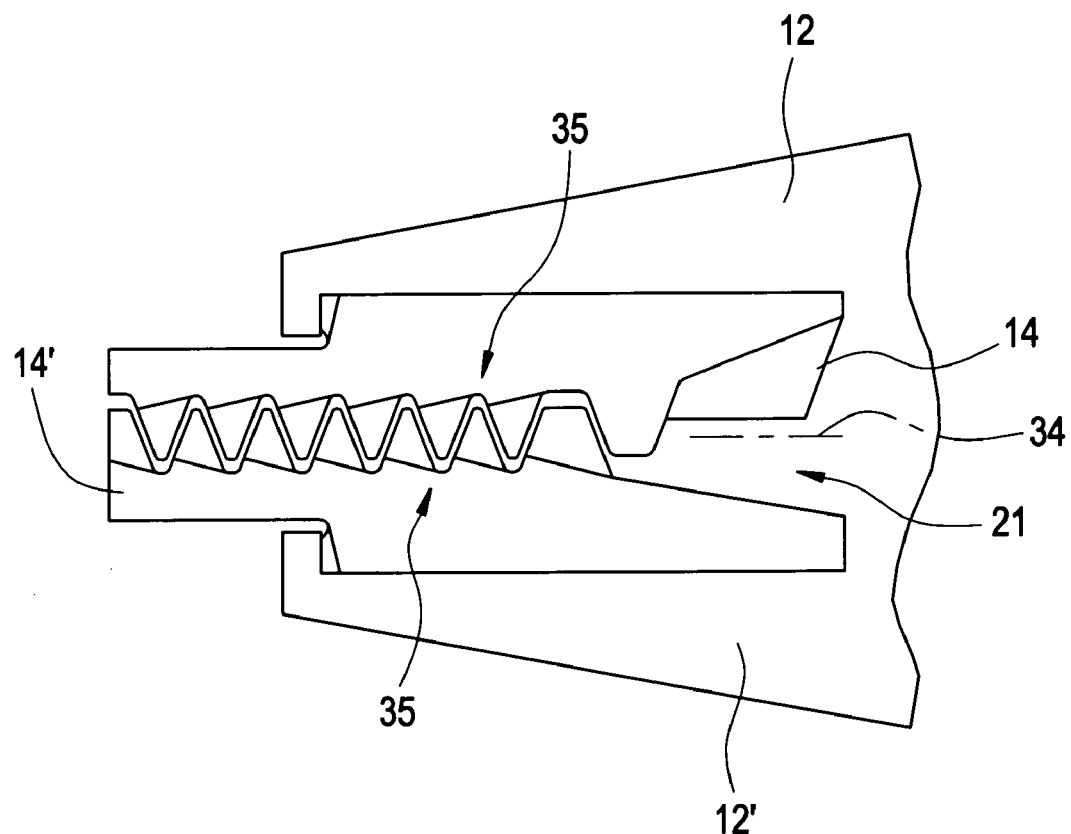
FIG. 2 is a side view of portions of a rotor and a stator in accordance with the invention.

With reference to FIGS. 1 and 2, the portion 10 comprises a disperger plate segment 14, 14' which is securable to the face of one of the disperger discs 12, 12'. Although in the illustrated embodiment the portion 10 is a unitary segment, each portion 10 could alternatively be provided as two or more segments.

The plate segment 14, 14' is attached to the disc face 16, in any convenient or conventional manner, such as by bolts (not shown) passing through bores 18. Typically, one end of the bolt engages the disc 12, 12' and at the other end has head structure bearing against a countersunk surface in the plate segment 14, 14'. The disc 12, 12', only a portion of which is shown, has a center about which the disc rotates, and a substantially circular periphery. The disperger plate segments 14, 14' are arranged side-by-side on the face 16 of the disc 12, 12', to form a substantially annular disperger face, shown generally at 20, 20'. The face 20 forms a portion of a disperger region 21, when confronting the face 20' of the disperger plate carried by the other disc.

Each disperger plate segment 14, 14' has an inner edge 22 near the center of the disc 12, 12', and an outer edge 24 near the periphery of the disc 12, 12'. The remainder of this description will refer to a single disperger segment 14, 14', but it should be understood that all the segments 14, 14' which define the annular plate, are preferably substantially similar. The plate segment 14, 14' has, on its face 20, radially concentric rows 26 of pyramids or teeth 28. Since the disc 12, 12' and plate segment 14, 14' rotate, the refined material is directed, as a result of centrifugal force, radially outward from the inner edge 22 to the outer edge 24, predominantly through the channels 30 formed between adjacent teeth 28 in each of the rows 26.

The rows 26 are at radii 32 chosen to allow the rotor and stator teeth 28 to intersect the plane 34 between the discs 12, 12' so that the fiber passing from the center of the stator to the periphery of the discs 12, 12' must receive impacts from the rotor teeth 28 as they pass close to the stator teeth 28. The clearance between the rotor teeth 28 and the stator teeth 28 is on the order of 1 to 12 mm so that the fibers are not cut but severely and alternately flexed, or pinched, at they pass through the intersections 35 defined by the teeth 28 on the rotor 12 and the teeth 28 on the stator 12'. This action breaks the ink and toner particles into smaller particles and also breaks the stickie particles.

With reference to FIGS. 3 and 4, each of the channels 30 has a lower base surface 34 and each of the teeth 28 has an upper top surface 36, wherein the top surface 36 of the tooth 28 and the lower base surface 34 of the channel 30 defines the height of the tooth 28. The radially inner face 38 and radially outer face 40 of each tooth 28 extend at an acute angle from the base surface 34 to the tooth top surface 36, forming a truncated pyramid. At least one substantially radially extending groove 42, 44 is formed in the surface 46 of each inner face 38 and each outer face 40 intermediate the leading and trailing edges 48, 50 of the tooth 28. Each of the grooves 42, 44 extends from the tooth top surface 36 to a position 52 intermediate the tooth top surface 36 and the base surface 34.

Each groove 42, 44 further creates an additional leading edge 54 and an additional trailing edge 56, increasing the number of intersections 35 and the total intersection length of the rotor and stator. It is possible to calculate the number of intersections 35 or pinches created per time and the total length of intersections 35 or pinches per time and per revolution of the rotor. As shown in the table below, increasing the number of intersections 35 and the total intersection length increases the number of flexures the fibers experience as they pass from the center of the stator to the periphery of the discs 12, 12'.

|  | Grooved Teeth | Conventional Teeth |
| --- | --- | --- |
| PPM (pinch counts/min) | 2.26E+9 | 566.1E+6 |
| IPPM (Inch pinches/min) | 3.42E+9 | 855.3E+6 |
| MP/s (meter pinches/sec) | 1,609,062 | 402,265 |
| Pinch meters per rev | 96,544 | 24,136 |
| Min open area (mm2) | 42,166 | 42,166 |

It should be noted that the grooves 42, 44 on the rotor and stator segments 14 combine to increase the pinch meters per revolution by a factor of four (4). The open area that the fibers pass through at the periphery is unchanged since the actual number of teeth 28 is unchanged.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A disperger plate segment for removing contaminants from recycled, or recovered, paper and packaging materials, the segment comprising radially inner and outer edges and a plurality of radially concentric rows of teeth; each row of teeth including a plurality of teeth and a plurality of channels disposed intermediate said teeth; each of the channels having a lower base surface and each of the teeth having an upper, top surface extending from a radially inner end to a radially outer end, a radially inner end face extending from the channel base surface to the tooth top surface, and a radially outer end face extending from the channel base surface to the tooth top surface; the teeth inner and outer end faces each defining a groove extending from the tooth top surface to a position intermediate the tooth top surface and the channel base surface.

2. The disperger plate segment of claim 1 wherein the inner and outer end faces of each tooth extend at an acute angle from the channel base surface to the top surface, defining a truncated pyramid shape.

3. The disperger plate segment of claim 1 wherein each of the teeth also has oppositely disposed leading and trailing edges, the groove of the inner end face of each tooth and the groove of the outer end face of each tooth being disposed intermediate the leading and trailing edges of the tooth.

4. The disperger plate segment of claim 3 wherein the groove of the inner end face of each tooth and the groove of the outer end face of each tooth define an additional leading edge and an additional trailing edge on the inner and outer end faces of each tooth, respectively.

5. The disperger plate segment of claim 1 wherein a segment of the tooth top surface is disposed between the groove of the inner end face and the groove of the outer end face.

6. A disperger plate segment for removing contaminants from recycled, or recovered, paper and packaging materials, the segment comprising radially inner and outer edges and a plurality of radially concentric rows of teeth; each row of teeth including a plurality of teeth and a plurality of channels disposed intermediate said teeth; each of the channels having a lower base surface and each of the teeth having a leading edge, a trailing edge, an upper, top surface extending from a radially inner end to a radially outer end, a radially inner end face extending from the channel base surface to the tooth top surface, and a radially outer end face extending from the channel base surface to the tooth top surface; the teeth inner and outer end faces each defining a groove disposed intermediate the leading and trailing edges and extending from the tooth top surface to a position intermediate the tooth top surface and the channel base surface, a segment of the tooth top surface being disposed between the groove of the inner end face and the groove of the outer end face.

7. A disperger for removing contaminants from recycled, or recovered, paper and packaging materials, the disperger having relatively rotating, opposed first and second discs carrying plates formed by a plurality of segments; wherein each segment comprises radially inner and outer edges and a plurality of radially concentric rows of teeth; each row of teeth including a plurality of teeth and a plurality of channels disposed intermediate said teeth; each of the channels having a lower base surface and each of the teeth having an upper, top surface extending from a radially inner end to a radially outer end, a radially inner end face extending from the channel base surface to the tooth top surface, and a radially outer end face extending from the channel base surface to the tooth top surface; the teeth inner and outer end faces each defining a groove extending from the tooth top surface to a position intermediate the tooth top surface and the channel base surface.

8. The disperger of claim 7 wherein the rows of teeth of the plate segments are radially spaced, whereby the rows of teeth of the plate carried by the first disc and the rows of teeth of the plate carried by the second disc intersect a plane disposed intermediate the first and second discs.

9. The disperger of claim 8 wherein the teeth of the plate carried by the first disc and the teeth of the plate carried by the second disc define a clearance gap having a value of 1 to 12 mm.

10. The disperger of claim 7 wherein the inner and outer end faces of each tooth extend at an acute angle from the channel base surface to the top surface, defining a truncated pyramid shape.

11. The disperger of claim 7 wherein each of the teeth also has oppositely disposed leading and trailing edges, the leading and trailing edges of each tooth of the plate carried by the first disc creating an intersection with the leading and trailing edges of corresponding teeth of the plate carried by the second disc as the discs relatively rotate, the intersections flexing fibers of the recycled, or recovered, paper and packaging materials and breaking the contaminants into pieces.

12. The disperger of claim 11 wherein the groove of the inner end face of each tooth and the groove of the outer end face of each tooth are disposed intermediate the leading and trailing edges of the tooth and define an additional leading edge and an additional trailing edge on the inner and outer end faces of each tooth, respectively, creating additional intersections.

13. The disperger of claim 7 wherein the first disc is a stator and the second disc is a rotor.

14. The disperger of claim 7 wherein the first disc is a rotor rotating in a clockwise direction and the second disc is a rotor rotating in a counter-clockwise direction.

15. A disperger for removing contaminants from recycled, or recovered, paper and packaging materials, the disperger having relatively rotating, opposed first and second discs carrying plates formed by a plurality of segments; wherein each segment comprises radially inner and outer edges and a plurality of radially concentric rows of teeth, the rows of teeth of the plate carried by the first disc and the rows of teeth of the plate carried by the second disc intersecting a plane disposed intermediate the first and second discs; each row of teeth including a plurality of teeth and a plurality of channels disposed intermediate said teeth; each of the channels having a lower base surface and each of the teeth having a leading edge, a trailing edge, an upper, top surface extending from a radially inner end to a radially outer end, a radially inner end face extending from the channel base surface to the tooth top surface, and a radially outer end face extending from the channel base surface to the tooth top surface; the teeth inner and outer end faces each defining a groove disposed intermediate the leading and trailing edges and extending from the tooth top surface to a position intermediate the tooth top surface and the channel base surface, a segment of the tooth top surface being disposed between the groove of the inner end face and the groove of the outer end face, the groove of the inner end face of each tooth and the groove of the outer end face of each tooth defining an additional leading edge and an additional trailing edge on the inner and outer end faces of each tooth, respectively, the leading and trailing edges of each tooth of the plate carried by the first disc creating an intersection with the leading and trailing edges of corresponding teeth of the plate carried by the second disc as the discs relatively rotate, the intersections flexing fibers of the recycled, or recovered, paper and packaging materials and breaking the contaminants into pieces.

16. The disperger of claim 15 wherein the first disc is a stator and the second disc is a rotor.

17. The disperger of claim 15 wherein the first disc is a rotor rotating in a clockwise direction and the second disc is a rotor rotating in a counter-clockwise direction.

* * * * *